May 27, 1958  D. RUTTEN  2,836,149
SILAGE DISTRIBUTOR
Filed April 4, 1957  2 Sheets-Sheet 1
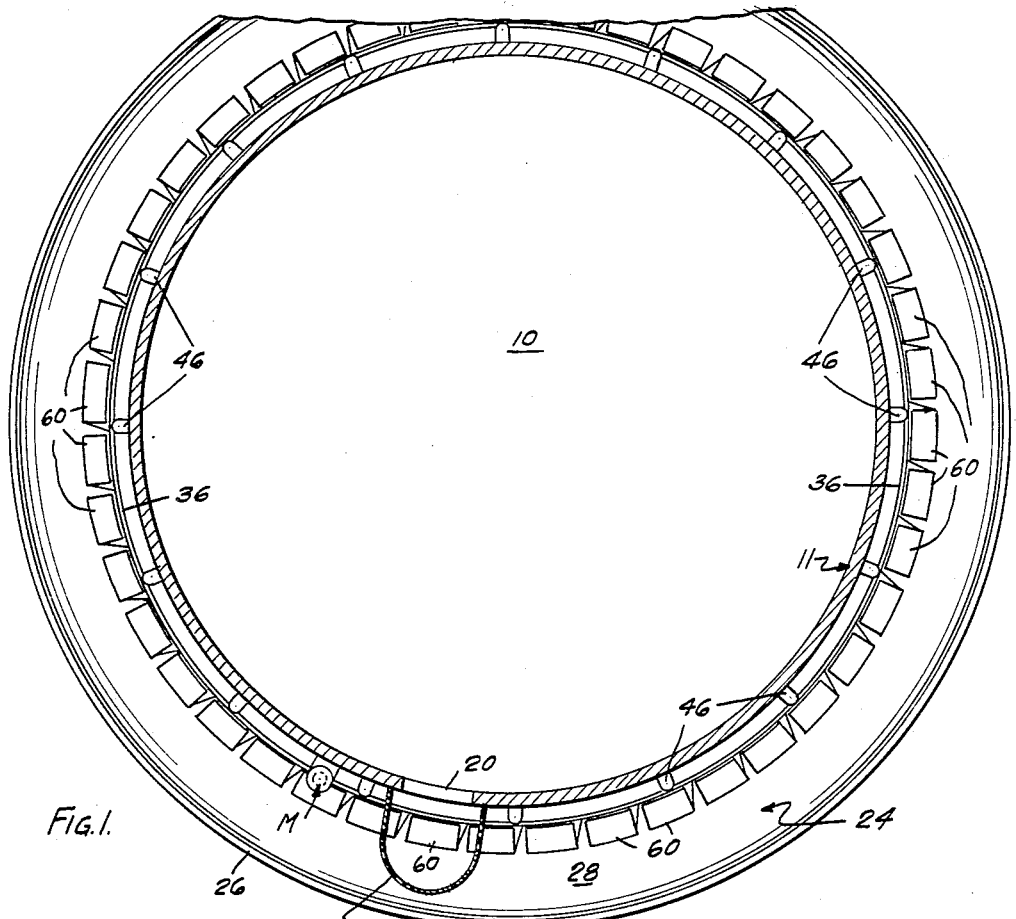
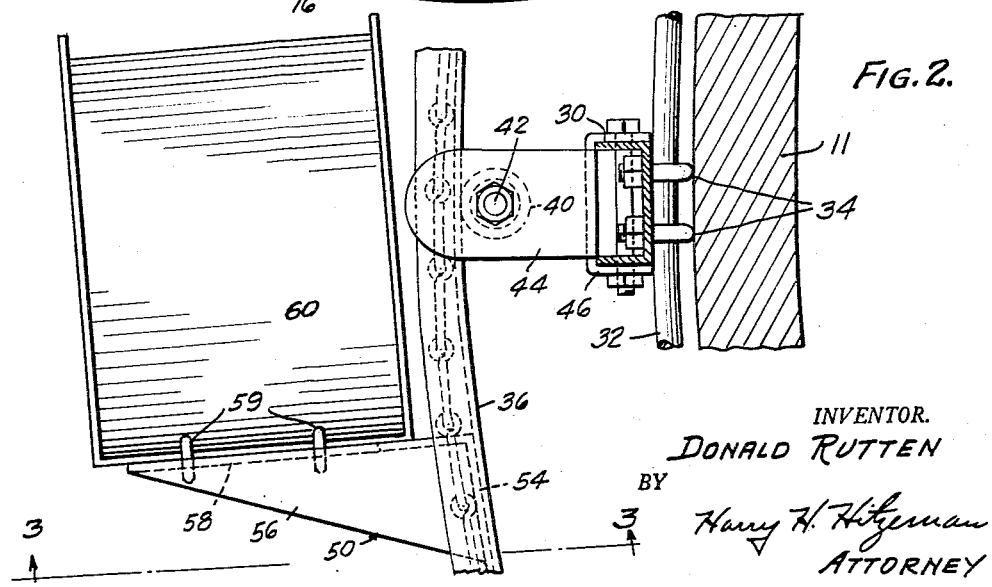
INVENTOR.
DONALD RUTTEN
BY
Harry H. Hitzeman
ATTORNEY May 27, 1958     D. RUTTEN     2,836,149
SILAGE DISTRIBUTOR
Filed April 4, 1957     2 Sheets-Sheet 2
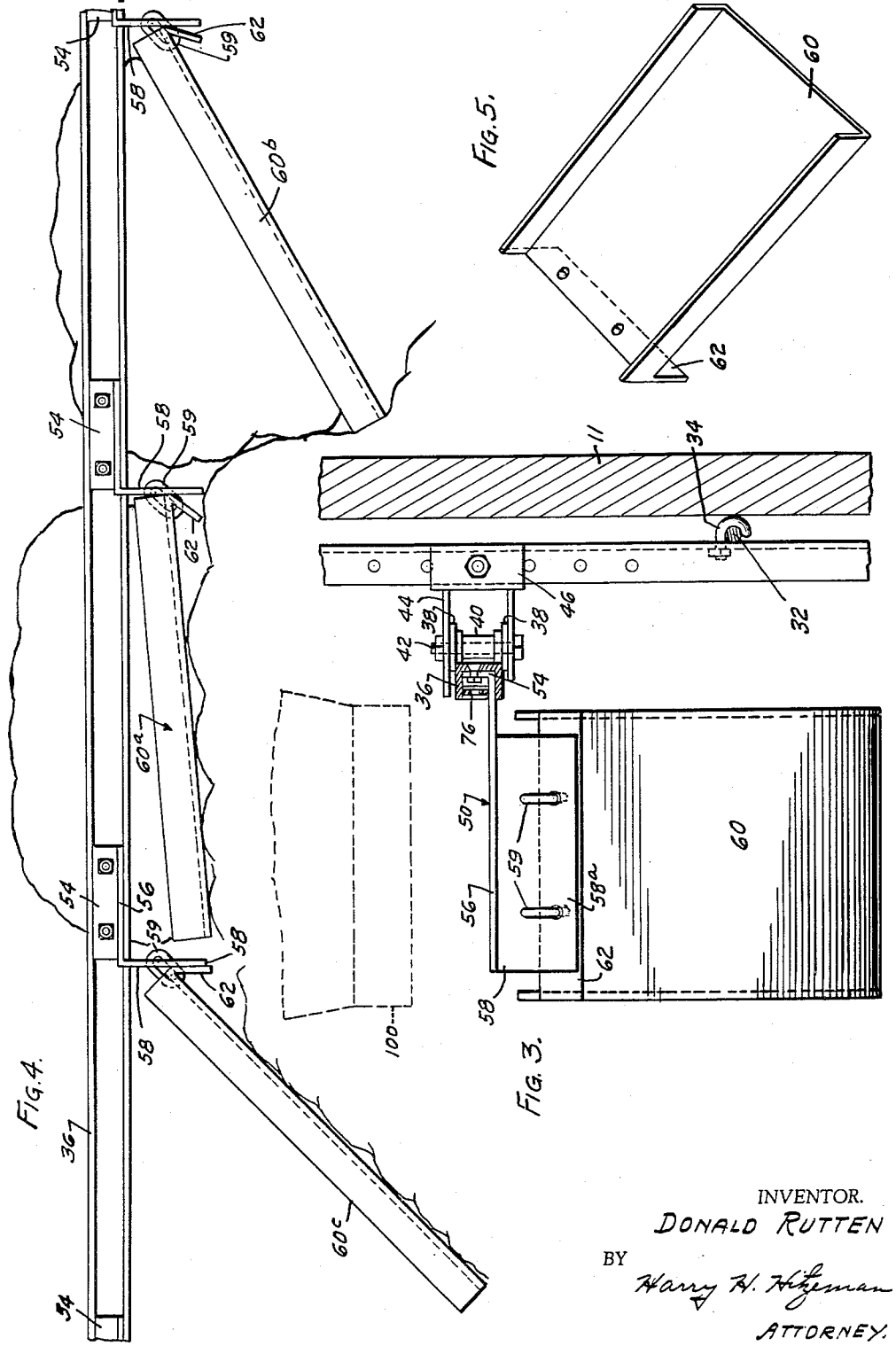
INVENTOR.
DONALD RUTTEN
BY Harry H. Hilgeman
ATTORNEY.

United States Patent Office 2,836,149
Patented May 27, 1958

2,836,149

SILAGE DISTRIBUTOR

Donald Rutten, Plainfield, Ill., assignor to Railoc Company, Inc., Plainfield, Ill., a corporation of Illinois Application April 4, 1957, Serial No. 650,603

7 Claims. (Cl. 119—52)

My invention relates to improvements in silage distributors.

My invention relates more particularly to a circular silage distributor used in connection with feeding silage in a stationary circular trough provided around the base of the silo.

As is well known in the art, most owners of silos also have a silage unloader on top of the silage in the silo for moving the silage out through a silo door in the wall to drop the same down through a chute to the base of the silo where the farmer then moves the silage to suitable feeding troughs from which it is eaten by the cattle.

In my co-pending application for patent, Serial No. 598,106, filed July 16, 1956, I describe and claim a silage distributor for moving silage dropped through the chute around the silo in a stationary trough which surrounds the silo.

In the above mentioned application I have shown a ring which encircles the silo above the trough, the ring being rotated and provided with spaced shovels or scoops which move silage from the spot directly below the silage discharge door around the silo in the trough, so that an entire herd of cattle may stand around the silo and eat out of the trough, the distributor moving the silage around the entire periphery of the trough for the cattle.

The present invention relates to improvements in the construction of the scoops or shovels which are carried by the rotatable ring for distributing the silage around the silo in the stationary trough. In using a rigidly supported scoop or shovel such as is shown in my co-pending application, I have found that certain types of moist feed or silage such as grass, for example, when moved by the scoops in an arc around the silo, have a tendency to "ball up," or roll in the formation of a ball, thus interfering with normal spreading or distribution of the feed. To eliminate this difficulty, I have pivotally connected the scoops or shovels to the supporting ring so that each scoop may be raised and ride over silage in the trough, carrying its supply of silage around the silo until it can drop by gravity in the trough beyond the filled part of the same.

For a more comprehensive understanding of the invention, reference is had to the following description and the accompanying drawings, upon which:

Fig. 1 is a plan sectional vew of a silo and encircling feed trough with a silage distributor associated therewith;

Fig. 2 is an enlarged fragmentary view of a portion of the silo wall, encircling ring and pivoted scoop carried thereby;

Fig. 3 is a vertical sectional view of the parts shown in Fig. 2 and is taken on the line 3—3 of Fig. 2;

Fig. 4 is a fragmentary side elevational view showing the rotating ring member and pivoted scoops or shovels carried thereby; and Fig. 5 is a front perspective view of one of the scoops.

In the embodiment of the invention which I have chosen to illustrate and describe the same, in Fig. 1 I have shown the usual circular silo 10 which may have a wall 11 constructed of concrete, cement blocks, wood, or other desirable material, in the shape of a hollow cylinder, usually provided with encircling hoop members and a dome-shaped roof member. These silos are also provided with a vertical enclosed chute 16 along one side of the same adjacent a vertically disposed row of door openings 20 in the wall 11 of the silo.

To provide a circular silage feeder and distributor, I have placed a circular trough 24 about the base of the silo, the trough including a circular vertical wall 26 and a trough bottom 28 extending from the wall 26 to the wall 11 of the silo.

As more clearly shown and described in my co-pending application hereinabove referred to, I mount a plurality of vertically disposed channel members 30 about the base of the silo and support the same upon a pair of spaced silo encircling hoop members 32. The vertical channel members are supported on the hoop members 32 by a pair of hook bolts 34 adjacent the top and bottom ends of the channel members 30. The ring member 36, which is preferably channel shaped as shown, is mounted for rotation between the shoulders 38 of rollers 40 that are mounted on bolt members 42 carried by parallel flanges 44 of a U-shaped bracket 46 that is fastened to the channel members 30.

For supporting the scoops or shovels 60, I provide brackets 50, the brackets being generally L-shaped and having a wall portion 54 lying against the vertical wall of the ring member 36, and a lateral extension 56 that has a down-turned flange 58. The scoops or shovel members 60 are pivotally connected to the down-turned flanges 58 by means of a pair of chain links 59, the links 59 being connected through suitable openings in the floor of the scoops 60 and suitable openings in the down-turned flange 58 of the support brackets 50.

The drive for rotating the ring member 36 may be similar to that shown in my previously mentioned application including an endless chain 76 driven by a motor M, and there may also be a tapered canvas bag member 100 as described therein for directing silage that falls down through the chute 16 into the path of the scoops or shovels 60.

As previously mentioned, with the rigidly supported scoops there has been a tendency for silage, especially if it is wet and stringy, such as grass, to start to "ball up" and roll, thus interfering with a smooth even distribution of feed about the trough. With the pivoted scoops or shovels 60 shown, there will first be an accumulation of feed to a height generally below the scoops or shovels when they pass in a horizontal position about the silo. Thus scoops passing under the opening at the end of the chute 16 will receive a deposit of silage and as they move forward they will ride over the top of the silage in the immediate vicinity until the scoops are permitted to drop by gravity, thus depositing the silage as they drop.

For example, as shown in Fig. 4, the scoop 60a may be passing over the level of silage under the chute, and as it comes to the position of scoop 60b it will start to drop the silage that was deposited on it under the chute and continue on its way around the silo. In order to prevent the scoops from hanging at a vertical angle, I have provided the ledges 62 on the back of the scoops and extensions 58a on the down-turned flange 58 of the bracket 50 so that the extreme angular position of the scoop 60 will be that shown by 60c, Fig. 4.

With the pivoted scoops as shown, it can be seen that the scoops or shovels will carry silage over the top of the feed already in the trough to a predetermined level and drop the same at the edge of the level pile of silage.

In this manner the level of the silage in the trough is gradually built up as the silage is carried around in the trough. Due to the pivotal mounting of the scoops and the fact that they carry the silage instead of pushing it as shown in my previous application, there will be no tendency for the scoops to roll or compress the feed during any part of their travel about the silo, and the action will result in a rapid carrying, dropping and filling of the entire circular trough with feed up to a desired level.

In addition, due to the fact that the only requirement of the drive motor is to rotate the ring and carry loaded scoops until the silage can be dropped, the load is much lighter than where the scoops are directed forwardly and shove the silage forward. With the comparative length of the scoops or shovels as shown, I have provided in effect a continuous carrying medium for the silage and much quicker distribution is effected.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. The combination with a silo having a vertical chute along one wall of the same, vertically aligned doors opening into said chute and a shallow stationary trough around the periphery of said silo at the base thereof, of a pair of hoops encircling said silo above said trough, a plurality of vertical support members carried by said hoops at spaced points around said silo, a roller mounted in each of said support members, all of said rollers being in horizontal alignment about said silo, a ring member encircling said silo and carried by said rollers, a plurality of scoops pivotally connected to said ring member and extending downwardly therefrom in said trough and means for rotating said ring member.

2. The combination with a silo having a vertical chute along one wall of the same, vertically aligned doors opening into said chute and a shallow stationary trough around the periphery of said silo at the base thereof, of a pair of hoops encircling said silo above said trough, a plurality of vertical support members positioned about said silo and carried by said hoops, rollers mounted in said support members in horizontal alignment, each of said rollers having outstanding peripheral flanges, a ring member carried by said rollers, said ring member being channel-shaped in cross section, outwardly extending brackets fastened to said ring member at spaced points around said silo, scoops pivotally fastened to said brackets and extending downwardly therefrom into said trough and means for rotating said ring member.

3. The combination with a silo having a vertical chute along one wall of the same, vertically aligned doors opening into said chute and a shallow stationary trough around the periphery of said silo at the base thereof, of a pair of hoops encircling said silo above said trough, a plurality of vertical support members positioned about said silo and carried by said hoops, rollers mounted in said support members in horizontal alignment, each of said rollers having outstanding peripheral flanges, a ring member carried by said rollers, said ring member being channel-shaped in cross section, outwardly extending brackets fastened to said ring member at spaced points around said silo, scoops pivotally fastened to said brackets and extending downwardly therefrom into said trough, and means for rotating said ring member, said brackets being L-shaped and having chain links for connection to the tops of said scoops.

4. The combination with a silo having a vertical chute along one wall of the same, vertically aligned doors opening into said chute and a shallow stationary trough around the periphery of said silo at the base thereof, of a pair of hoops encircling said silo above said trough, a plurality of vertical support members positioned about said silo and carried by said hoops, rollers mounted in said support members in horizontal alignment, each of said rollers having outstanding peripheral flanges, a ring member carried by said rollers, said ring member being channel-shaped in cross section, outwardly extending brackets fastened to said ring member at spaced points around said silo, scoops pivotally fastened to said brackets and extending downwardly therefrom into said trough, and means for rotating said ring member, said brackets being L-shaped and having chain links for connection to the tops of said scoops, each of said scoops having a back ledge bearing against a portion of its supporting bracket for limiting downward swinging movement of the same.

5. The combination with a silo having a vertical chute along one wall of the same, vertically aligned doors opening into said chute and a shallow stationary trough around the periphery of said silo at the base thereof, of a pair of hoops encircling said silo above said trough, a plurality of vertical support members positioned about said silo and carried by said hoops, rollers mounted in said support members in horizontal alignment, each of said rollers having outstanding peripheral flanges, a ring member carried by said rollers, said ring member being channel-shaped in cross section, outwardly extending brackets fastened to said ring member at spaced points around the silo, scoops pivotally fastened to said brackets and extending downwardly therefrom into said trough, and means for rotating said ring member, said brackets being L-shaped and having chain links for connection to the tops of said scoops, each of said scoops having a back ledge bearing against a portion of its supporting bracket for limiting downward swinging movement of the same, and each of said scoops being of sufficient length so that the end of one may underlie the pivot of the adjacent scoop when swinging about its pivot to a horizontal plane.

6. The combination with a silo having a vertical chute along one wall of the same, vertically aligned doors opening into said chute and a shallow stationary trough around the periphery of said silo at the base thereof, of a pair of hoops encircling said silo above said trough, a plurality of vertical support members positioned about said silo and carried by said hoops, rollers mounted in said support members in horizontal alignment, each of said rollers having outstanding peripheral flanges, a ring member carried by said rollers, said ring member being channel-shaped in cross section, outwardly extending brackets fastened to said ring member at spaced points around said silo, scoops pivotally fastened to said brackets and extending downwardly therefrom into said trough, and means for rotating said ring member, said brackets being L-shaped and having chain links for connection to the tops of said scoops, each of said scoops having a back ledge bearing against a portion of its supporting bracket for limiting downward swinging movement of the same, and each of said scoops being of sufficient length so that the end of one may underlie the pivot of the adjacent scoop when swinging about its pivot to a horizontal plane, said scoops being flat and rectangular in shape with upturned side walls and adapted to ride over silage dropped in said trough below said chute and carry silage dropped on the same around the silo to distribute silage to the same level in said entire trough.

7. The combination with a silo having a vertical chute along one wall of the same, vertically aligned doors opening into said chute and a shallow stationary trough around the periphery of said silo at the base thereof, of a pair of hoops encircling said silo above said trough, a plurality of vertical support members positioned about said silo and carried by said hoops, rollers mounted in said support members in horizontal alignment, each of said rollers having outstanding peripheral flanges, a ring member carried by said rollers, said ring member being channel-shaped in cross section, outwardly extending brackets fastened to said ring member at spaced points around said silo, scoops pivotally fastened to said brackets and extending downwardly therefrom into said trough and means for rotating said ring member, said means comprising a motor vertically supported on the side of said silo, a sprocket driven thereby and a chain surrounding said silo and positioned in said ring member to frictionally rotate the same.

References Cited in the file of this patent

UNITED STATES PATENTS

| | | |
|---|---|---|
| 2,286,143 | Lee | June 9, 1942 |
| 2,571,490 | Sanders et al. | Oct. 16, 1951 |
| 2,704,995 | Dueringer | Mar. 29, 1955 |
| 2,747,546 | Winter | May 29, 1956 |